UNITED STATES PATENT OFFICE.

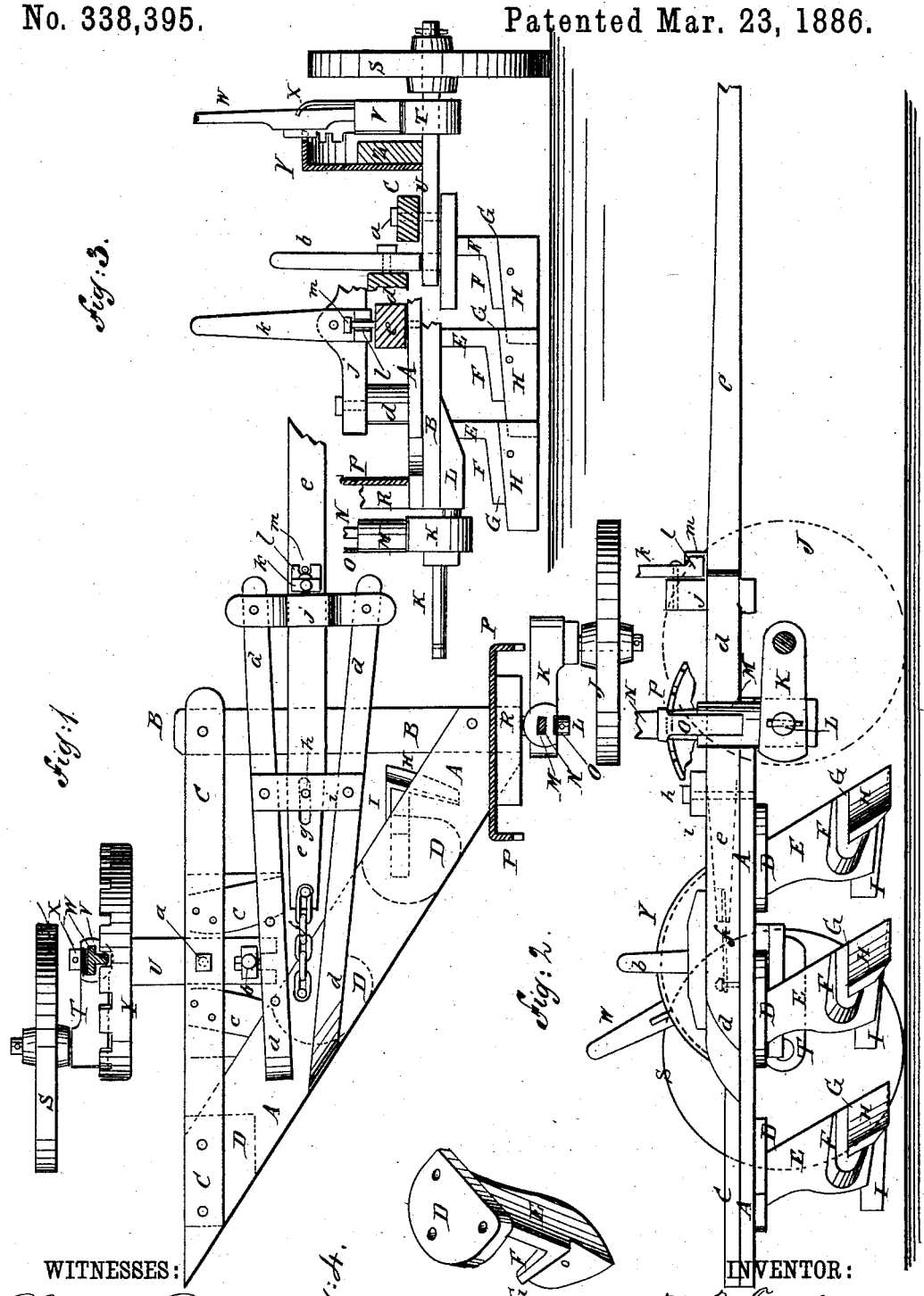

MOSES P. FARNHAM, OF GERMANTOWN, CALIFORNIA.

WHEEL-PLOW.

SPECIFICATION forming part of Letters Patent No. 338,395, dated March 23, 1886.

Application filed May 16, 1885. Serial No. 165,761. (No model.)

*To all whom it may concern:*

Be it known that I, MOSES PEMBER FARNHAM, of Germantown, in the county of Colusa and State of California, have invented certain new and useful Improvements in Wheel-Plows, of which the following is a full, clear, and exact description.

Reference is to be had to the accompanying drawings, forming part of this specification, in which similar letters of reference indicate corresponding parts in all the figures.

Figure 1 is a plan view of my improvement, partly in section. Fig. 2 is a side elevation of the same, partly in section. Fig. 3 is a front elevation of the same, partly in section. Fig. 4 is a perspective view of one of the plow-standards and its frog or arm.

The object of this invention is to facilitate the replowing of summer-fallowed land.
The invention consists in the construction and arrangement of parts, as will be hereinafter fully described and claimed.

The frame of the machine is made in the form of a right-angled triangle; and it consists of the diagonal bar A, the bar B, placed at right angles with the line of draft, and the bar C, placed parallel with the line of draft. To the lower side of the diagonal bar A are attached the cap-plates D, formed upon the upper ends of the plow-standards E. Upon the lower ends of the standards E are formed, or to them are attached, rearwardly-inclined frogs or arms F, which are rabbeted to form shoulders G along their upper edges for the upper edges of the shares H to rest against. The shoulders G are made of a height equal to the thickness of the shares H, so that the plows will present a smooth forward surface to the soil. The frogs or arms F are made low, so that the soil will pass over them readily. Landsides I may be attached to the standards E, if desired, to resist the side-push of the plows, and when used should be made small. The standards E should be attached to the diagonal bar A in such positions that the outer end of the share of each following plow will project slightly into the furrow or cut of the preceding plow, so that the roots of all vegetation growing upon the ground will be cut off, and the said vegetation shaken clear of soil and left so exposed to the sun and wind as to be quickly killed.

J is the furrow or plowed-land wheel, which revolves upon the journal of the crank-arm K. The inner end of the crank-arm K is pivoted to the axle L, the inner end of which is secured to the bars A B at their point of meeting.

Upon the inner end of the crank-arm K is cast a box or socket, M, in which is pivoted the lower end of the lever N, and to which is attached the lower end of the spring O. The upper end of the spring O is bent inward to rest against the outer side of the lever N, and hold the said lever against the toothed catch bar or plate P. The upper end of the spring O is forked, to keep it from slipping off the lever N. The toothed catch bar or plate P is attached to the bars A B at their point of meeting, and the connection is strengthened by a bar, R, attached to it and to the said bars A B. With this construction, by operating the lever N the crank-arm K can be turned upon the axle L to raise and lower the wheel J to level the frame and adjust the plows to work at any desired depth in the ground.

S is the land-wheel, which revolves upon the journal of the crank-arm T, the inner end of which is pivoted to the outer end of the axle U. Upon the inner end of the crank-arm T is cast a socket-box, V, in which is pivoted the lower end of the lever W, and to which is attached the lower end of the spring X. The upper end of the spring X is bent inward to rest against the outer side of the lever W and hold the said lever against the toothed catch bar or plate Y. The upper end of the spring X is forked to keep it in place upon the said lever W. The catch bar or plate Y is attached to the axle U, and the connection is strengthened by a bar, Z, attached to it and to the said axle U. The axle U is pivoted to the middle part of the bar C of the frame by a bolt, *a*, and its inner end is forked, to receive the lower end of the lever *b*, so that by operating the said lever the axle U can be inclined rearward or forward to cause the plows to take or leave land.

The part of the frame of the machine with which the axle U is connected is strengthened by the brace-bars *c* attached to it. The adjacent edges of the brace-bars *c* are rounded, as shown in Fig. 1, so that they can be placed near the opposite sides of the pivoted axle U without interfering with the movement of the said axle upon its pivot. The lever $b$ is pivoted to one of the brace-bars or hounds $d$, and is designed to be provided with a catch-bar or other suitable means for holding it in any position into which it may be adjusted, which catch-bar is not shown in the drawings. The hounds $d$ are attached to the bars A B of the frame, with their rear ends closer together than their forward ends, so as to receive the tongue $e$ between them and allow the necessary play. The rear end of the tongue $e$ is connected with the diagonal bar A by a short chain, $f$, and at a little distance from its rear end has a short slot, $g$, formed in it, to receive a fulcrum-bolt, $h$, which is secured to a short cross-bar, $i$, attached to the hounds $d$.

To a cross-bar, $j$, attached to the upper side of the forward ends of the hounds $d$, is pivoted a lever, $k$, the lower end of which has a forwardly-projecting forked lug, $l$, formed upon or attached to it, to engage with a pin, $m$, attached to the tongue $e$. With this construction, by operating the lever $k$, when the forward end of the tongue $e$ is secured to the neck-yoke of the team, the forward end of the machine will be moved to one or the other side to cause the plows to take or leave land, as may be desired.

Having thus described my invention, I claim as new and desire to secure by Letters Patent—

1. In a sulky-plow, the combination, with the frame, of the horizontally-adjustable axle U, pivoted between its ends to the frame and slotted at its inner end, the crank-arm T, pivoted to swing vertically on the said axle, the land-wheel journaled on said crank-arm, the vertical pivoted lever $b$, engaging the slotted end of lever U, the lever W, connected to crank-arm T, and the spring X and the toothed catch-plate Y on opposite sides of the said lever, substantially as set forth.

2. In a wheel-plow, the combination, with the frame A B C and the tongue $e$, having slot $g$, of the hounds $d$, the short chain $f$, the fulcrum-bolt and cross-bars $h$ $i$, and the cross-bar, lever, and pin $j$ $k$ $l$ $m$, substantially as herein shown and described, whereby the forward end of the frame can be readily adjusted to cause the plows to take or leave land, as set forth.

MOSES P. FARNHAM.

Witnesses:
W. H. GREGORY,
J. S. JONES.